United States Patent Office 3,586,735
Patented June 22, 1971

3,586,735
RUBBER MIXTURES REINFORCED BY PHENOL NOVOLAC RESINS AND PROCESS FOR PREPARING PHENOL NOVOLAC RESINS SUITABLE THEREFOR
Arnold Giller, Wehen, Taunus, Kurt Hultzsch, Wiesbaden, and Wolfgang Hesse, Wiesbaden-Biebrich, Germany, assignors to Chemische Werke Albert, Wiesbaden-Biebrich, Germany
Continuation of application Ser. No. 544,404, Apr. 22, 1966. This application Nov. 13, 1969, Ser. No. 871,551
Claims priority, application Germany, Apr. 29, 1965, C 35,728; July 24, 1965, C 36,494
Int. Cl. C08d 9/10
U.S. Cl. 260—845                 8 Claims

ABSTRACT OF THE DISCLOSURE

A non-smelling and non-discoloring elastomer composition comprising at least one vulcanizable elastomeric copolymer and at least one phenol novolac-hexamethylenetetramine-resin as a reinforcing resin, said phenol novolac having been prepared by acid condensation of a diphenylolalkane of the formula

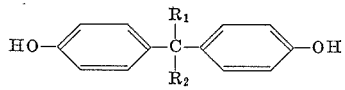

with formaldehyde, or a functional equivalent thereof, the radicals $R_1$ and $R_2$ being the same or different and representing hydrogen or an alkyl group of up to 8 carbon atoms or one of the radicals $R_1$ and $R_2$ being a phenyl group and a process for the preparation of said novolac or for the preparation of a vulcanized product from said composition.

---

This application is a streamlined continuation application of our copending, commonly assigned U.S. patent application Ser. No. 544,404 filed Apr. 22, 1966, now abandoned.

PRIOR ART

Reinforced elastomer compositions, especially those based on nitrile rubber, have been proposed in which a finely ground, non-hardened phenol novolac-hexamethylenetetramine resin, i.e., a mixture of a novolac derived from a phenol and hexamethylenetetramine and which may be partially prereacted is compounded with the elastomer. These resins particularly increase the hardness, the stress values and also to some extent the tensile strength of the vulcanisates. The reinforcing effect of these phenol novolac-hexamethylenetetramine-resins is dependent on the type of the elastomer, the nature and the amount of the fillers used and also on the structure of the resins. The effect of phenol novolac-hexamethylenetetramine-resins, which belong to the group of "reinforcing resins," is described in detail in the "Kautschuk-Handbuch" of S. Boström, Berliner Union, Stuttgart, vol. 2, page 200 et seq., in the brochure of British Resin Products "Cellobond Rubber Reinforcing Resins" (1961) and in the journal "Rubber and Plastics Age," vol. 45 (1964), page 1205. According to the last mentioned publication the reinforcing resins harden in the mixture without reacting in any notable amount with the elastomer. The vulcanisate may therefore be considered as a resite plasticized by a vulcanised rubber mixture or as a rubber vulcanisate reinforced by a resite. Thus, the reinforcing effect of the resins depends on their compatibility with the components of the elastomer composition. Apart from their reinforcing effect all reinforcing resins prepared from common phenol hitherto proposed have two outstanding disadvantages which limit their use, i.e., their smell of phenol and their discoloration on exposure to light.

According to the present invention we provide an elastomer composition comprising at least one vulcanizable elastomeric copolymer and at least one phenol novolac-hexamethylenetetramine-resin as a reinforcing resin, said phenol novolac having been prepared by acid condensation of a diphenylolalkane of the formula:

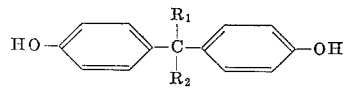

with formaldehyde or a functional equivalent thereof, the radicals $R_1$ and $R_2$ being the same or different and representing hydrogen or an alkyl group of up to 8 carbon atoms or one of the radicals $R_1$ and $R_2$ being a phenyl group.

The reinforcing effect of the above resins in the elastomers is very good and compares favorably with that of the hitherto known resins recommended for this purpose.

Preferred novolacs are those derived from a p,p'-diphenylolalkane in which $R_1$ and $R_2$ both represent a hydrogen atom or methyl group.

It has been proposed that phenolic compounds having one or more free reactive positions in the aromatic nucleus, ortho- or para- to a free phenolic hydroxy group may be condensed with formaldehyde in the presence of condensation agents. The condensation of formaldehyde with diphenylolpropane, preferably in an alkaline medium, e.g. in the presence of an alkali hydroxide or ammonia to yield hardenable resins has also been proposed. Definite examples of acidic condensations of diphenylolpropane with formaldehyde to yield a novolac, have however, not yet been described.

Although the preparation of oil-soluble acid-condensed resins from diphenylolpropane and formaldehyde has been described the condensation reactants were an adduct of diphenylolpropane with acetone or a mixture of adducts with a further amount of diphenylolpropane and formaldehyde. Condensation agents referred to for this reaction include hydrochloric acid, formic acid, acetic acid, oxalic acid, lactic acid and phthalic acid. The products obtained according to this process are sometimes strongly discolored. Moreover, the relatively large amounts of acid employed (about 5%) have to be washed or neutralized at a certain stage of production as otherwise undesirable acid residues may cause decomposition of the resin to yield a black product when working up the condensation product at elevated temperatures, e.g. above 150° C. However this still does not prevent decomposition occurring at relatively low temperatures, e.g. at 100° C., even after washing and neutralisation. Hence these resins are usually colored yellow to red.

According to a further feature of the invention we provide a process for the preparation of a novolac suitable as a reinforcing resin in the compositions described above wherein p,p'-diphenylolpropane is condensed with formaldehyde or a functional equivalent thereof, in the presence of at least one inert organic, preferably aromatic solvent, a minor amount of water and from 0.1 to 0.6%, calculated on the weight of the diphenylolpropane, of at least one weak organic acid.

By the term "functional equivalent thereof" as used herein we mean a compound which under the reaction conditions in question yields formaldehyde.

The disadvantages and difficulties mentioned above are reduced by the preparation of condensation products from a p,p'-diphenylolpropane and formaldehyde according to the invention. Novolacs are thus obtained which do not require removal of the catalyst from the condensation products by washing or neutralisation and which are relatively free from discoloration.

Examples of weak organic acids which may be employed in the process according to the invention are lactic acid, tartaric acid, citric acid, succinic acid, adipic acid, phthalic acid or propionic acid. The use of oxalic acid is particularly preferred. The condensation may readily be carried out with a proportion of 0.1% by weight of oxalic acid, calculated on the diphenylolpropane. Preferably the concentration of acid used lies within the range of about 0.2 to 0.4% by weight. When acids other than oxalic acid are used, the use of an equivalent amount is recommended. The speed of the reaction may be increased by increasing the proportion of weak organic acid. However, with quantities of acid above 0.6% by weight a distinct and increased discoloration is observed.

At the low concentrations stated above the reaction speed of the condensation is usually low owing to the facts that the diphenylolpropane is present in the solid state due to its insolubility in water and that it is less reactive than phenols unsubstituted in the p-position. By using an inert organic solvent, the boiling point of which is preferably in the range from 100–160° C., such as di-n-butyl ether, di-isobutyl ether, diamyl ether, aromatic hydrocarbons such as ethylbenzene, preferably toluene or xylene, the concentration of the dissolved diphenylolpropane is considerably increased and the condensation reaction is thereby accelerated. Similar results are obtained by the use of paraformaldehyde. Since the inert solvents cannot "liquefy" the diphenylolpropane, a minor amount of water has to be present, which together with the formaldehyde being present therein as methylene glycol causes the "liquefaction" of the diphenylolpropane.

Preferably the amount and boiling point of the solvent used are selected to ensure that the boiling point of the azeotropically boiling aqueous reaction mixture is as high as possible. The reaction may also be carried out under pressure, in which case longer heating to above 120° C. is preferably avoided since decomposition may occur if noticeable amounts of water are present. The ratio between solvent and water may also be varied, however, for economic reasons it is desirable to keep the proportion of the solvent low. The amount of solvent may be as high as desired e.g. 300% by weight, based on the diphenylolpropane. Preferably however, the minimum amount of solvent is used. The formaldehyde is conveniently present partly as an aqueous solution, i.e. in an amount which contains the amount of water required and partly in the form of para-formaldehyde. Thus, the amount of paraformaldehyde to be added depends upon the quantity of formaldehyde required after the addition of the aqueous solution of formaldehyde. It is also possible, although less convenient to use paraformaldehyde only and water for the condensation with the diphenylolpropane. The amount of water is preferably also kept low in order to increase the promoting effect of the para-formaldehyde on the reaction speed. The minimum amounts of solvent compatible with efficient stirring of the reaction mixture are for example about 33% by weight of solvent and about 5% by weight of water, calculated on the amount of diphenylolpropane used. The maximum amount of water is preferably about 12% by weight, calculated on the amount of diphenylolpropane used. When these quantities of reactants are employed reaction times vary between 3 to 6 hours.

Preferably one half to somewhat less than 1 mol of formaldehyde is used per mol of the diphenylolpropane. A direct relationship exists between this molar ratio and the molar weight of the condensation products which determines characteristics such as viscosity and melting point of the condensation product. The condensation is reproducible particularly since during the reaction and subsequent processing no substance need be removed by washing or steam distillation. The theoretical yield of condensation product is usually obtained.

The preparation of the condensates is conveniently carried out by mixing the total amount of solvent and water, at least a part of the formaldehyde and about half of the diphenylolpropane. The remaining diphenylolpropane and formaldehyde, and finally the catalyst, may be added while the mixture is heated to 80 to 90° C. The reaction mixture is then refluxed for e.g. 3 to 6 hours until the free formaldehyde content of a sample of the mixture attains a low, predetermined value, e.g. 0.6% by weight, but not more than 1% by weight, calculated on the complete batch. The water is then removed by collecting the distillate and separating off the water, preferably continuously, and returning the solvent. Subsequently the solvent is distilled preferably in a descending cooler, the batch being finally heated in vacuo to more than 140° C., preferably 180 to 200° C. and may then be hot discharged. No phenolic waste products are obtained in the reaction. The separated water contains only a minor amount of formaldehyde.

The resins obtained are clear, nearly colorless novolacs, having a color value of 2 to 6 (according to Hellige, cf. Henry A. Gardner, "Physical and Chemical Examination of Paints, Varnishes, Lacquers and Colors," 7th edition, Washington, D.C., U.S.A., page 183). They are odorless, soluble in polar solvents, resistant to yellowing and are distinguished from other phenol novolacs by their ability to release solvents rapidly. These properties render the resins suitable not only as reinforcing resins but also as varnishes and especially as binding agents for printing colors.

For the manufacture of reinforced vulcanizable elastomeric compositions the novolacs are preferably ground as fine as possible while adding generally 5–10% of hexamethylenetetramine, calculated on the weight of the novolac. This powdered mixture of resin and hexamethylenetetramine is then incorporated into the elastomeric composition as reinforcing resin. It is, however, also possible to add the novolac and the hexamethylenetetramine separately to the mixture. This procedure is advantageous if the mixture during mixing is warmed to such an extent that the reinforcing resin would be prematurely hardened. A vulcanisation agent is also added prior to the vulcanisation.

Preferred phenol novolac - hexamethylenetetramine resins are those having a melting point in the range from 65 to 115° C., particularly from 70 to 110° C. It is noted that the resins of higher molecular weight melting in this range impart greater rigidity in the elastomeric compositions, as is evident from the higher modulus values (at 300% elongation).

According to the invention the reinforcing resin is preferably incorporated in the elastomeric compositions in an amount of from 1 to 150% by weight, preferably from 3 to 80% by weight, calculated on the elastomer. However, if required, larger quantities of resin can be used. The elastomeric compositions may also contain, in addition to the resins according to the invention active or inactive light fillers or carbon black together with other known reinforcing resins such as phenol resins, melamine resins and/or urea resins or the like, especially condensates with formaldehyde. The reinforcing resins of the invention are particularly suitable for addition to butadiene-acrylonitrile rubber, the resulting compositions being applicable for a variety of purposes, e.g. for tank coatings, particularly solid soles and commercial rubber goods, such as buffers, tubes, mats, coatings, printing plates, printing cloths etc.

Mixtures of other elastomers such as natural rubber, butadiene-styrene-rubber, ethylene-propylene-terpolymer rubbers, butyl rubber, polychloroprene, mixtures of at least two of these elastomers or mixtures of at least one of these elastomers with butadiene-acrylonitrile rubber may also be reinforced by the resins according to the invention. The third component of ethylene-propylene-terpolymer rubber may contain a pair of conjugated double bonds, but is preferably a non-conjugated diolefin such as dicyclopentadiene, pentadiene - 1,4 hexadiene - 1,4, norbornadiene-2,5, 5-methylenenorbornene, a 5-alkenyl-norbornene, 2-alkyl-norbornadiene-2,5, 1,5-cyclooctadiene etc. Although large quantities of reinforcing resin may be added to the elastomers described above other than butadiene-acrylonitrile-rubber, the preferred quantities of resin are with these elastomers from about 3 to about 30%, calculated on the weight of the elastomer. It is advisable to determine the favorable proportions in each case by tests.

The vulcanisates produced according to the invention are distinguished by their apparent lack of any odor and their good stability on exposure to light, provided of course that they do not contain other additives which may impair these properties, such as age resistors.

The following examples illustrate the invention; all parts being by weight.

Example 1

Elastomeric compositions were prepared on a roll mill at between 85 and 100° C. comprising 100 parts of butadiene-acrylonitrile elastomer (34% acrylonitrile content, cold polymerized, containing a non-discoloring age resistor, Mooney-viscosity 83), 5 parts of zinc oxide, 1.5 parts of stearic acid, 1.5 parts of sulphur, 1.5 parts of sulphur, 1.5 parts of 2-mercaptobenzothiazole and 50 parts of a reinforcing resin. In three experiments the following resins were used:

(A) A commercial pure phenol novolac-hexamethylenetetramine resin having a melting interval (according to the capillary method) of about 78/85° C. and a hexamethylenetetramine content of about 10 g. per 100 g. of novolac, (B) A commercial phenol novolac-hexamethylenetetramine-resin modified by the addition of cashew nut shell oil having a melting interval (according to the capillary method) of about 65/72° C. and a hexamethylenetetramine content of about 8 g. per 100 g. of novolac and (C) A reinforcing resin produced according to Example 3, obtained by grinding 100 g. of a diphenylolpropane-novolac having a melting point of about 90° C. with 6 g. hexamethylenetetramine.

Test results of samples which had been vulcanized for 30 minutes at 155° C.:

| With resin | A | B | C |
|---|---|---|---|
| Hardness of the vulcanisate (° Shore A) | 76 | 95 | 95 |
| Modulus 300 (kg./cm.²)[1] | 150 | 182 | 121 |
| Impact resistance (kg./cm.) | 15 | 46 | 46 |
| General appearance of the vulcanisates | (²) | (³) | (⁴) |

[1] Exact definition: load at 300% elongation.
[2] Yellow-brown, turbid, smell of phenol.
[3] Brown-black, smell of cashew nut shell oil.
[4] Amber-colored, transparent, nearly odorless.

Resin A and the elastomer are compatible only to a limited extent, the hardness and the impact resistance are therefore only moderately high. On prolonged exposure to light the vulcanisate still has a distinct smell of phenol and is also discolored. Although resin B is readily compatible with the rubber and therefore has a good reinforcing effect, elastomer compositions containing this resin tend to turn a very dark color and have the characteristic musty smell of cashew nut shell oil. Resin C, the resin according to the invention, is also readily compatible with the rubber and reinforces almost as well as resin B and distinctly better than resin A. Moreover, it does not discolor the vulcanisate and has no undesirable smell. The smaller modulus value, but not the greater hardness and the higher impact resistance are accounted for by the lower amount of hexamethylenetetramine present in resin C than in resin A or B.

When using a reinforcing resin similar to resin C, which has been modified by the addition of more hexamethylenetetramine to the novolac and/or by the use of a higher melting novolac, compositions having a higher value of modulus 300% are obtained.

Example 2

The reinforcing effect of resin C in natural rubber is demonstrated by mixing at between 85 and 100° C., 100 parts of natural rubber, 2 parts of stearic acid, 4 parts of commercial zinc oxide, 2.5 parts of a commercial accelerator (mixture of dibenzothiazyldisulphide and basic accelerators, Vulkacit F (registered trademark) of Farbenfabriken Bayer, Leverkusen, Germany), 1 part of phenyl-β-naphtylamine, 6 parts of a commercial activator for the filler (activator R of Degussa, Frankfurt (Main), Germany), 60 parts of precipitated silicic acid, 3.5 parts of triethanolamine, 3.2 parts of sulfur and 15 parts of resin C. The mixture was vulcanized for 10 minutes at 150° C. The vulcanisates had a hardness of 88° Shore A, a modulus 300% of 95 kg./cm.² and an impact resistance of 75 kg./cm.

A comparison between the above rubber composition and a resin-free rubber composition is only possible in a qualitative manner, since a mixture produced without a resin and a plasticizer can only be processed with difficulty. The reinforcing resin in the example acted as a plasticizer and as a reinforcing agent. Its reinforcing effect was also good in this case. In contrast with other reinforcing resins it is particularly useful in the production of odorless vulcanisates which are also substantially stable towards light.

Example 3

20 parts of aqueous formaldehyde (30%), 75 parts of toluene and 114 parts of p,p'-diphenylolpropane were introduced into a vessel provided with a reflux condenser, a descending cooler, a water-separator, a thermometer and a stirrer and a heater and heated to 80° C. A further 114 parts of p,p'-diphenylolpropane, 15.85 parts of paraformaldehyde (89%) and 0.75 part of oxalic acid containing water of crystallisation were added with stirring. The batch was refluxed with stirring for 4 hours, the content of free formaldehyde being reduced to 0.74%. The water was then removed by collecting the azeotropic distillate, separating off the water and returning the solvent to the reaction vessel. 24 parts of water having a content of formaldehyde of 1.66% were obtained. After distilling off the toluene on the descending cooler until the reaction temperature was 180° C., 236 parts of a light novolac having a color value of 3 (according to Hellige) and a melting point of 90° C. were obtained.

Example 4

20 parts of aqueous formaldehyde (30%), 74 parts of xylene and 114 parts of p,p'-diphenylolpropane were introduced into the apparatus described in Example 3, adapted for the application of a vacuum and the mixture was heated to 80° C. A further 114 parts of p,p'-diphenylolpropane, 18.8 parts of paraformaldehyde (96%) and 0.75 part of oxalic acid containing water of crystallisation were added with stirring. The batch was refluxed with stirring for 4½ hours, the content of free formaldehyde being reduced to 0.83%, and the water azeotropically distilled off. 27 parts of water having a content of 1.83% of formaldehyde were thus separated and the xylene was distilled in the descending cooler at first under normal pressure and then in vacuo after attaining a sump temperature of 180° C. After the reaction mixture had obtained a temperature of 200° C. this temperature was maintained for a further 15 minutes. 237 parts of a novolac were obtained having a melting point of 108° C. and a color value of 3 (according to Hellige). The resin is suitable as binding agent for printing colors soluble in alcohol and for use in varnishes. It is distinguished by lack of any apparent odor, resistance to yellowing and improved release of organic solvents.

Example 5

20 parts of aqueous formaldehyde (30%), 75 parts of toluene, 228 parts of p,p'-diphenylolpropane, 15.85 parts of paraformaldehyde (89%) and 1.5 parts of oxalic acid containing water of crystallisation were reacted as described in Example 3. The reaction was maintained for 2.5 hours until a free formaldehyde content of 0.74% was attained. 235 parts of a novolac were obtained having a melting point of 90° C. and a color value of 9 (according to Hellige). The increase in the color value caused by the larger amount of oxalic acid demonstrates that the addition of oxalic acid cannot be increased much further without increasing the color value of the resin. Thus, this is still suitable for technical purposes, but no longer as binding agent for light varnishes or printing colors.

We claim:

1. A non-smelling and non-discoloring composition comprising at least one sulfur vulcanizable elastomeric polymer and at least one phenol novolac-resin-hexamethylenetetramine as a reinforcing resin, said phenol novolac resin having been prepared by acid condensation of a diphenylolalkane of the formula

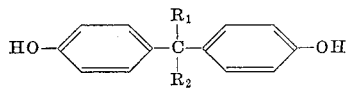

with formaldehyde, or a functional equivalent thereof, the radicals $R_1$ and $R_2$ being the same or different and representing hydrogen or an alkyl group of up to 8 carbon atoms or one of the radicals $R_1$ and $R_2$ being a phenyl group.

2. An elastomer composition as claimed in claim 1, wherein the content of hexamethylenetetramine in the phenol novolac-hexamethylenetetramine-resin is in the range from 5 to 10%, calculated on the weight of the novolac.

3. An elastomer composition as claimed in claim 1 wherein the melting point of the phenol novolac-hexamethylenetetramine resin is in the range from 65 to 115° C. and wherein the phenol novolac is derived from a diphenylolalkane in which $R_1$ and $R_2$ both represent a methyl group.

4. An elastomer composition as claimed in claim 1 having a phenol novolac-hexamethylenetetramine-resin content of 1 to 150%, calculated on the weight of the elastomer component, and also containing at least one filler or at least one reinforcing resin or both.

5. An elastomer composition as claimed in claim 1, wherein the elastomer component is butadiene-acrylonitrile rubber.

6. An elastomer composition as claimed in claim 1, wherein the elastomer component is natural rubber, butadiene-styrene rubber, ethylene - propylene - terpolymer-rubber, the third component of which ethylene-propylene-terpolymer elastomer is a non-conjugated diolefin, butyl rubber, polychloroprene, a mixture of at least two of these elastomers, or a mixture of at least one of these elastomers with butadiene-acrylonitrile-rubber and wherein the amount of the phenol novolac-hexamethylenetetramine-resin is in the range from about 3 to 30%, calculated on the weight of the elastomer component.

7. A process for preparing a vulcanized product wherein a composition as claimed in claim 1 is heated in the presence of a vulcanizing agent until a vulcanized product is formed.

8. Vulcanized products whenever prepared from a vulcanizable elastomeric composition as claimed in claim 1.

References Cited

UNITED STATES PATENTS

| | | | |
|---|---|---|---|
| 3,256,368 | 6/1966 | Soldatos et al. | 260—848 |
| 3,419,527 | 12/1968 | Arutin et al. | 260—51 |

FOREIGN PATENTS

| | | | |
|---|---|---|---|
| 564,192 | 10/1958 | Canada | 260—845 |
| 608,947 | 9/1948 | Great Britain | 260—845 |
| 592,278 | 9/1947 | Great Britain | 260—51 |

MURRAY TILLMAN, Primary Examiner

C. J. SECCURO, Assistant Examiner

U.S. Cl. X.R.

260—3, 51, 846, 848